United States Patent [19]

Braunhardt et al.

[11] Patent Number: 5,356,338

[45] Date of Patent: Oct. 18, 1994

[54] AXIAL ROTOR HAVING AN INDEPENDENTLY DRIVEN THRESHING SECTION AND SEPARATING SECTION

[75] Inventors: Klaus A. Braunhardt, Bettendorf, Iowa; Mark F. Stickler, Silvis, Ill.; Raymond M. Andes, Jr., Bettendorf, Iowa; Merle R. Gerber, Moline, Ill.

[73] Assignee: Deere & Company, Moline, Ill.

[21] Appl. No.: 53,125

[22] Filed: Apr. 26, 1993

[51] Int. Cl.⁵ .............................. A01F 12/26
[52] U.S. Cl. ........................ 460/69; 460/83; 460/119
[58] Field of Search .......... 460/69, 68, 70, 71, 460/72, 73, 76, 83, 119

[56] References Cited

U.S. PATENT DOCUMENTS

| | | | |
|---|---|---|---|
| 3,483,975 | 12/1969 | Yetter et al. | 209/297 |
| 4,274,426 | 6/1981 | Williams. | |
| 4,408,618 | 10/1983 | Witzel. | |
| 4,875,891 | 10/1989 | Turner et al. | 460/110 |
| 4,969,853 | 11/1990 | Coers | 460/69 X |
| 5,045,025 | 9/1991 | Underwood | 460/66 |
| 5,112,279 | 5/1992 | Jensen et al. | 460/69 |

Primary Examiner—Terry Lee Melius

[57] ABSTRACT

An axial agricultural combine having independently driven threshing and separating sections. A midpoint support bearing is located between the threshing and separating sections of the rotor. The midpoint support bearing is provided with a saddle mounted to the sidesheets of the combine and extending across the bottom portion of the rotor housing. A sealing disc is mounted to the saddle and has a sealing ring that covers the threshing section/separating section interface and a web that is provided with a bearing assembly. The drive shaft for driving the threshing section passes through this bearing.

6 Claims, 7 Drawing Sheets

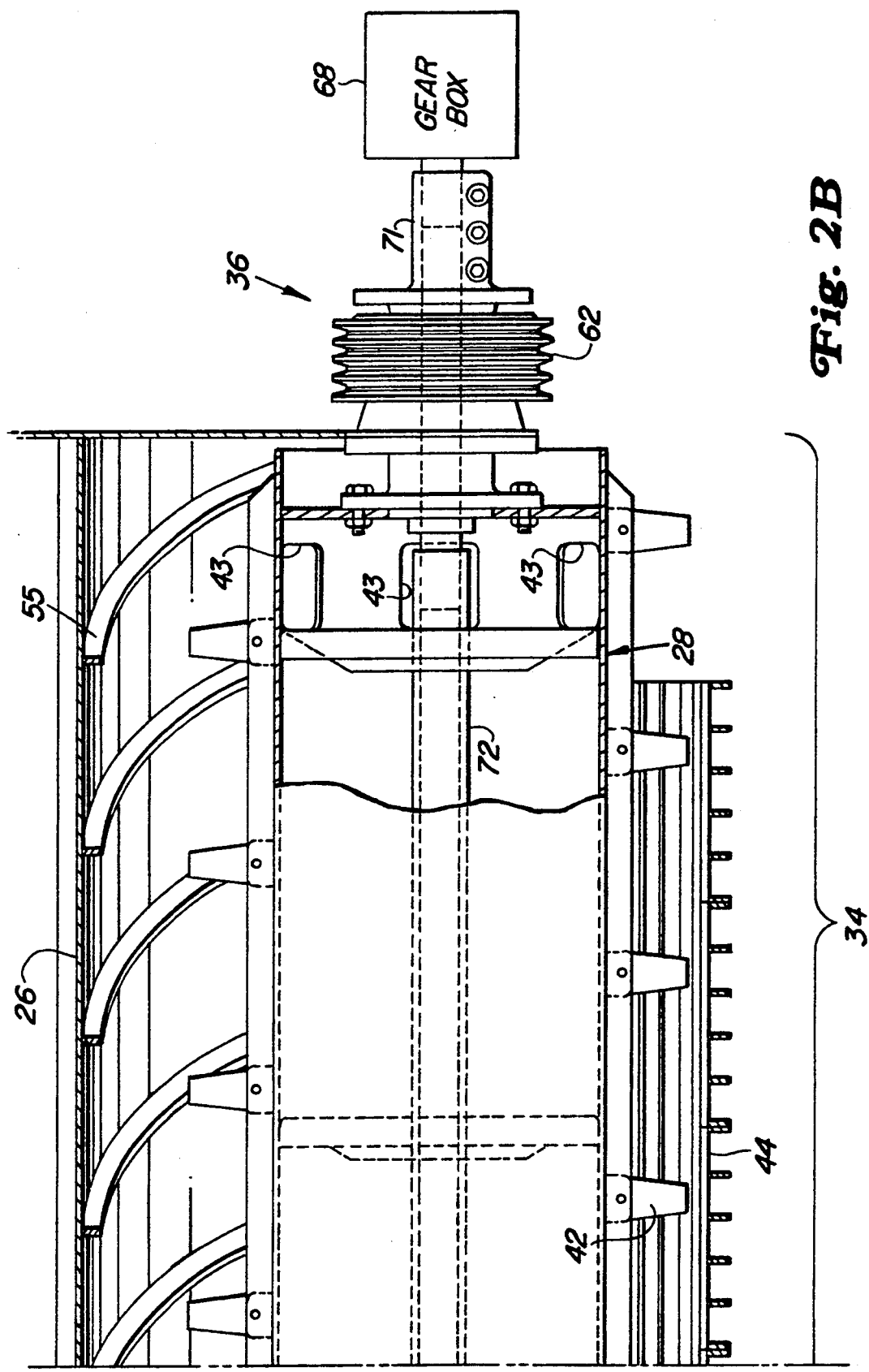

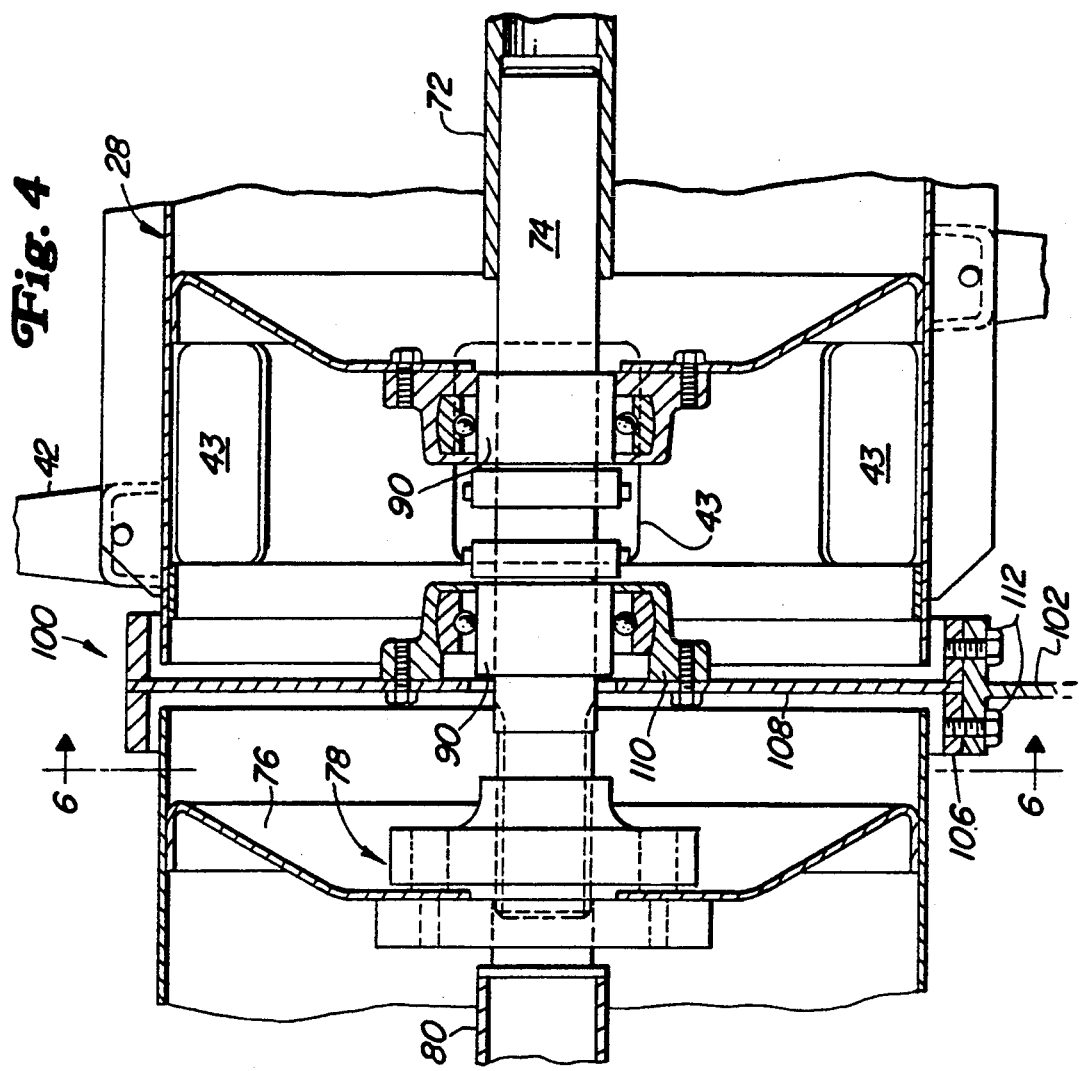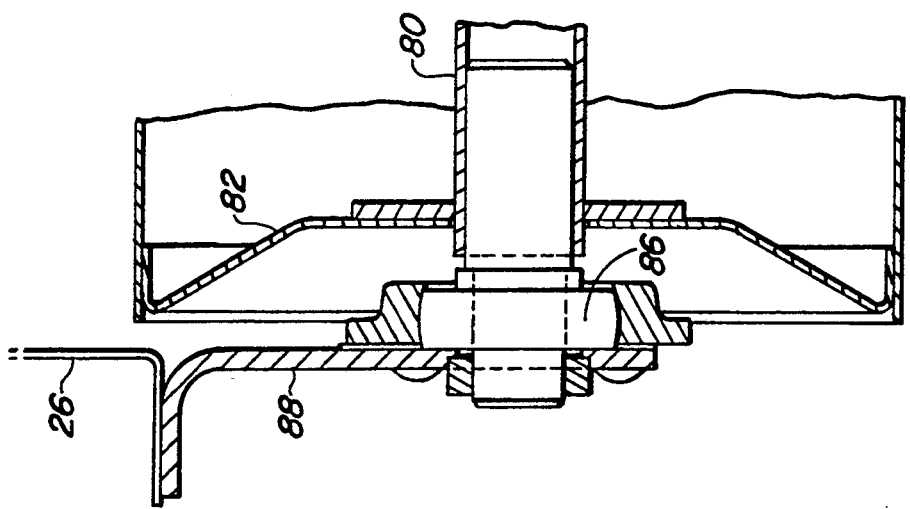

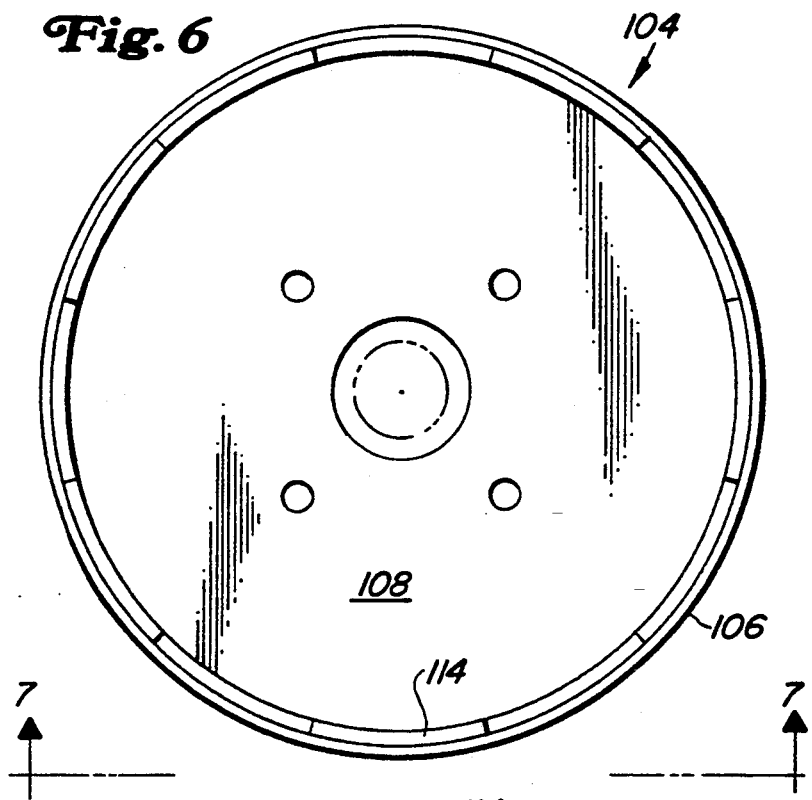
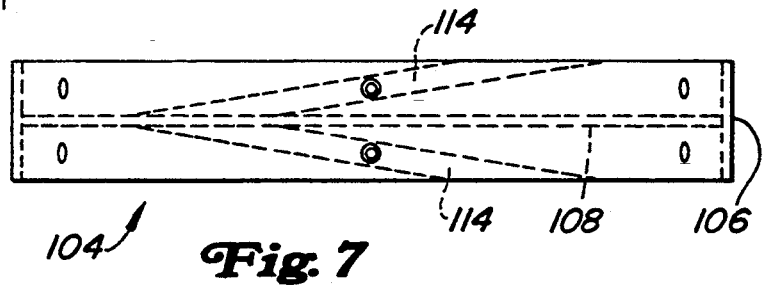
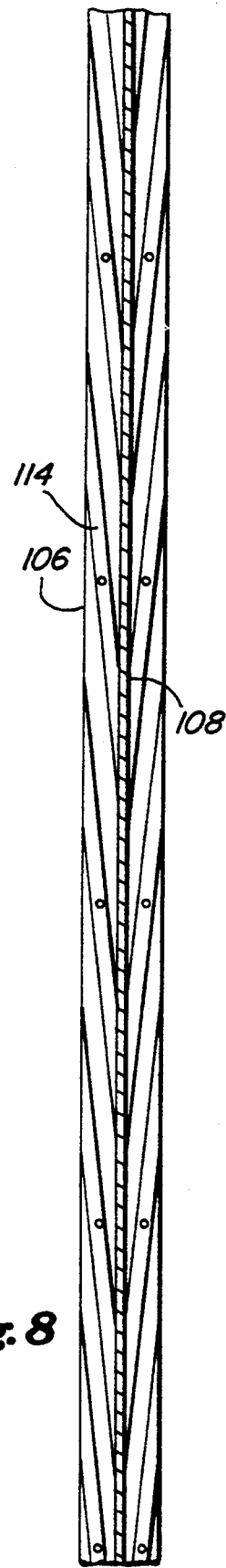

5,356,338

AXIAL ROTOR HAVING AN INDEPENDENTLY DRIVEN THRESHING SECTION AND SEPARATING SECTION

BACKGROUND OF THE INVENTION

1. Field of the Invention

The invention is directed to an axial agricultural combine having a rotor with a feeding and threshing section, and a separating section that can be driven independently of one another.

2. Description of the Prior Art

Case IH of Racine, Wisconsin, and New Holland, of New Holland, Pa., currently market axial flow combines. The Case IH combine is fitted with a single longitudinally arranged rotor located between the sidesheets of the combine. This rotor together with its housing threshes and separates the harvested crop material. The New Holland combine uses two side-by-side rotors also longitudinally arranged between the sidesheets of the combine. These rotors together with their housings also thresh and separate the harvested crop material.

The rotors of both of these combines are single units that are driven by a gearbox located at the rear of the rotor housing. The same rotational speed used in the threshing operation is also used in the separating operation. As such the operational rotational speed of the rotor is a compromise between optimal speed for threshing and optimal speed for separating. One attempt to optimize these operations is disclosed in U.S. Pat. No. 5,112,279 which discloses a hybrid combine having a transverse independently controlled threshing cylinder and an axial separating rotor.

The axial separator unit disclosed in the above-identified patent comprises a cylindrical rotor housing having a bottom portion provided with a grate and a top portion provided with helical vanes for indexing the crop material to the rear of the housing; and a rotor having crop engaging assemblies that engage the crop located in the bottom portion of the housing and throw it upwards against the helical vanes. The central longitudinal axis of the rotor is located below the central longitudinal axis of the housing making the rotor non-concentric with the housing.

A combine having an axial rotor with independently driven threshing and separating sections has been proposed. The proposed rotor was concentrically arranged in a rotor housing with bearing supports at each end of the housing.

SUMMARY

It is an object of the present invention to provide an axial rotor for a combine having an independently driven threshing and separating sections which is provided with a midpoint support bearing.

It is a feature of the invention that the central longitudinal axis of the rotor is located below the central longitudinal axis of the rotor housing. Crop engaging assemblies located on the rotor engage the crop material in the bottom portion of the rotor housing and throw it upward and release the crop material against helical vanes located on the top portion of the rotor housing.

The midpoint support bearing is located at the interface of the independently driven threshing and separating sections of the rotor. A saddle extends across the bottom portion of the rotor housing and is mounted to the sidesheets of the combine. A sealing disc is mounted to the saddle and extends upwardly between the threshing and separating sections of the rotor. The sealing disc comprises a circular sealing ring having a web that extends across the ring. The inner diameter of the circular sealing ring is larger than the outer diameter of the rotor, thereby providing a cover for the threshing section/separating section interface. The web is provided with a bearing assembly for the drive shaft driving the threshing section of the rotor. The sealing ring is provided with inwardly projecting vanes for preventing dust, dirt and debris from accumulating between the rotor and the ring.

BRIEF DESCRIPTION OF THE DRAWINGS

FIGS. 2a and 2b are cross sectional views of the axial crop processing unit.

FIG. 3 is a cross sectional view of the front end plate of the threshing section.

FIG. 4 is a cross sectional view of the midpoint support bearing.

FIG. 6 is an end view of the sealing disc.

FIG. 7 is a side view of the sealing disc.

FIG. 8 is an unwrapped view of the inner surface of the circular sealing ring.

FIG. 9 is an end view taken along line 9—9 of FIG. 2a.

DETAILED DESCRIPTION

Figure 1:
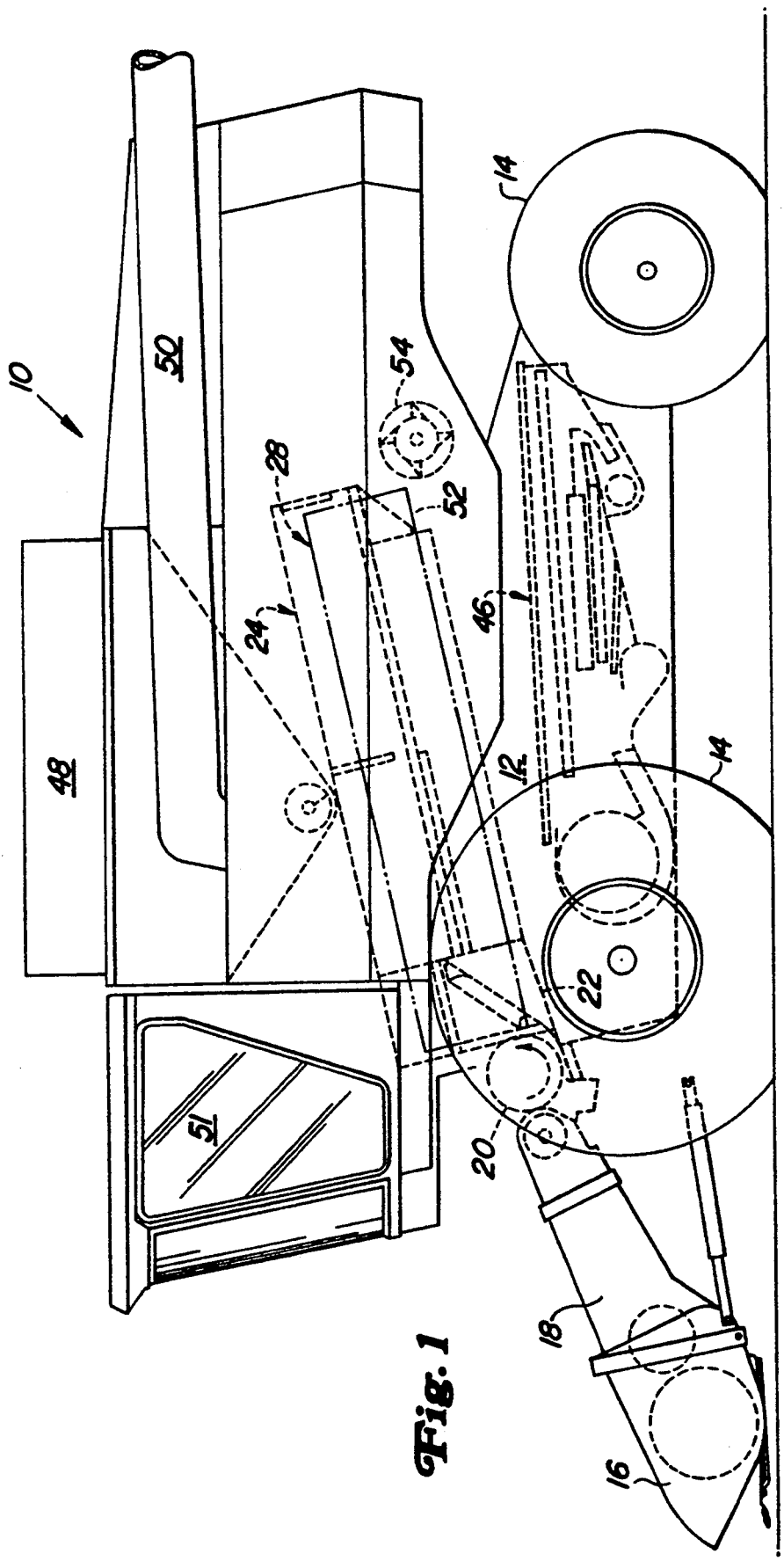
FIG. 1 is a semi-schematic side view of a agricultural combine of the present invention.

FIG. 1 is shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between the sidesheets of the combine. The sidesheets form part of the supporting structure.

Figure 2A:
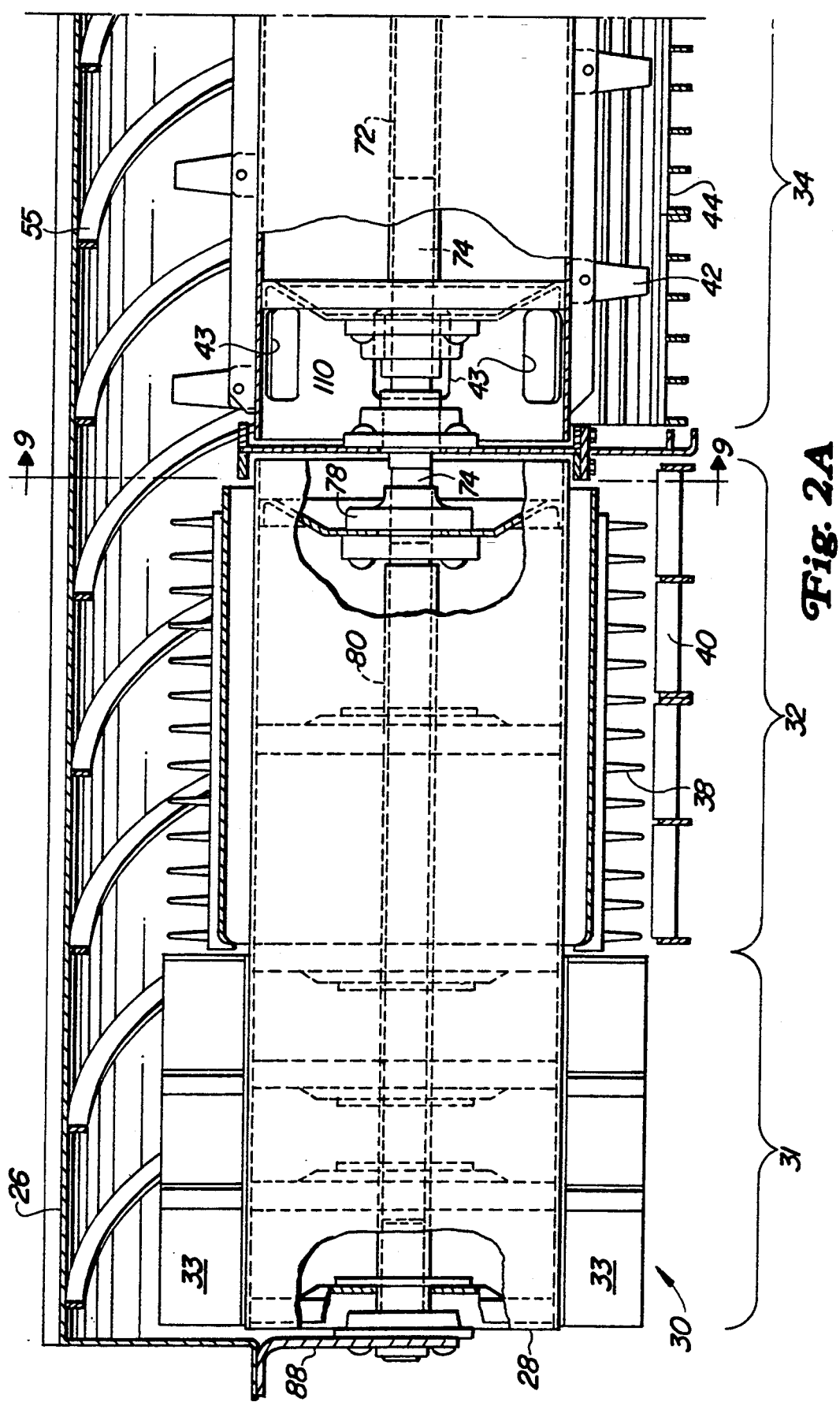
Figure 5:
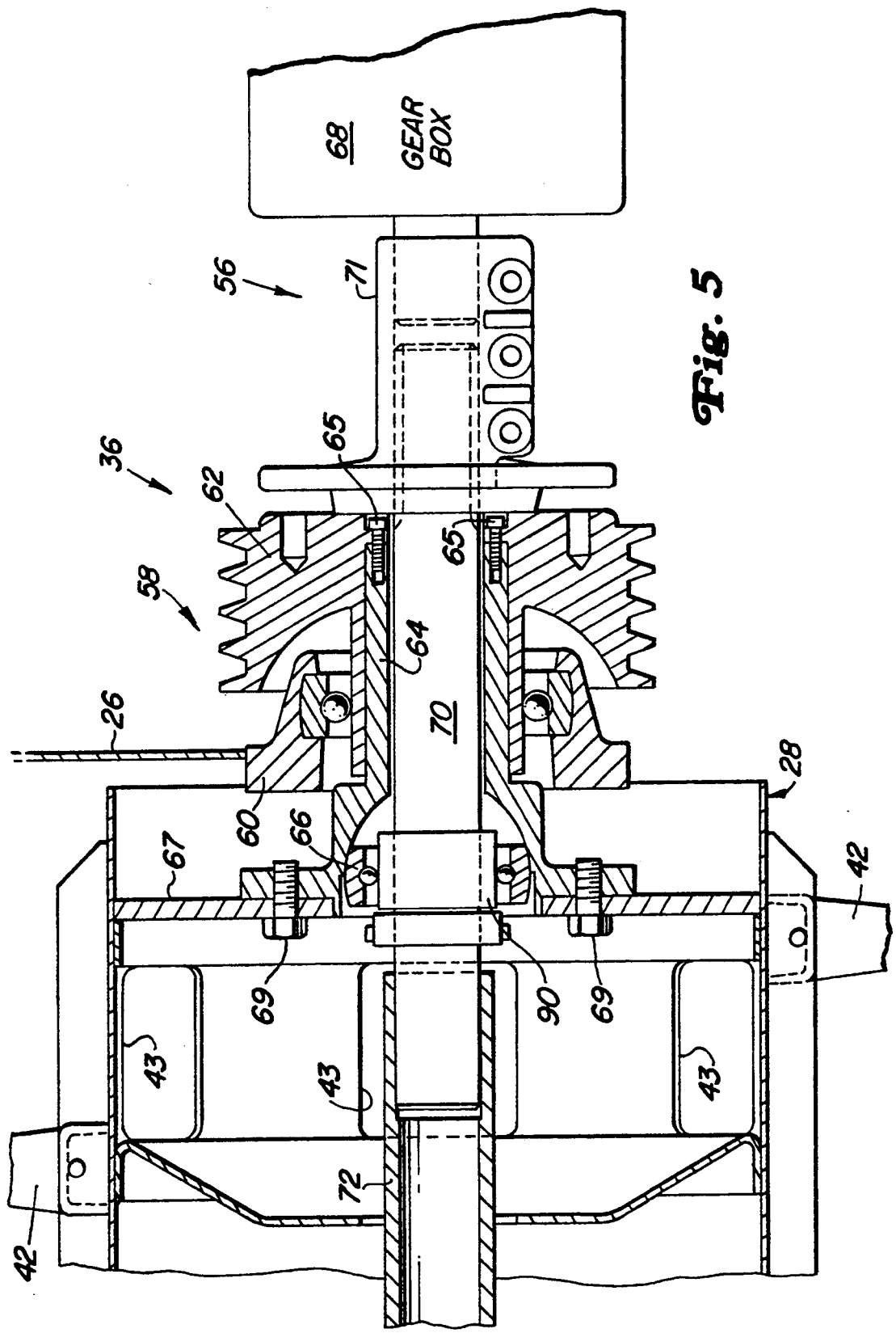
FIG. 5 is a cross sectional view of the end plate of the separating section and the drive means.

The axial crop processing unit 24, best illustrated in FIGS. 2a and 2b, comprises an axial rotor housing 26 and an axial rotor 28 located in the housing. The harvested crop enters the housing through an inlet 30. The rotor is provided with a feeding section 31, a threshing section 32 and a separating section 34. The feeding section is provided with helical vanes 33 which start the harvested crop material rotating around the housing.

Both crop processing sections, the threshing section 32 and the separating section 34, are independently driven by driving means 36 which will be discussed in more detail later. Both sections are provided with crop engaging assemblies 38 and 42. The threshing crop engaging assemblies 38 comprise spiked teeth may cooperate with stationary spiked teeth (not shown) located on the bottom portion of the rotor housing to thresh the harvested crop. Grain and chaff released from the crop mat falls through concave 40 located on the bottom portion of the rotor housing. The concave forms a grate that prevents the passage of crop material larger than grain or chaff from entering the cleaning system 46.

The crop engaging assemblies of the separating section 34 comprise outwardly projecting separating vanes 42. The separating section is provided with openings 43 which allow dust and dirt to exit this section of the rotor. The bottom portion of the housing under the separating section is provided with a grate 44 through which grain and chaff released during the separating process falls.

As illustrated in FIG. 1, grain and chaff falling through the grates 40 and 44 is directed to cleaning system 46 which removes the chaff from the grain. The clean grain is then directed by an elevator conveyor (not shown) to clean grain tank 48 where it can be directed to a truck or grain cart by unloading auger 50. As the straw reaches the end of the crop processing unit it is expelled through outlet 52 to beater 54. The beater propels the straw out the rear of the combine. The operation of the combine is controlled from operator's cab 51.

All three sections of the rotor are provided with crop engaging assemblies 33, 38 and 42 that engage the crop in the bottom portion of the rotor housing and throw it upwardly until it releases from the assemblies and engages the helical vanes 55 located on the top portion of the housing.

The means for driving the rotor 36 comprises a feeding and threshing section drive 56 and a separator section drive 58. Both drives pass through bearing assembly 60 that is mounted to the back of the rotor housing 26. The separator section drive is a fixed speed drive comprising sheave 62 and tubular drive shaft 64 that are bolted together by bolts 65. The tubular drive shaft is bolted to the end wall 67 of rotor 28 by bolts 69. The tubular drive shaft 64 is provided with a spherical bearing 66 through which the feeding and threshing section drive passes.

The feeding and threshing section drive is a variable speed drive which is controlled by variable speed gearbox 68. The gearbox is coupled to drive shaft segment 70 by coupling 71. The drive shaft segment 70 passes through tubular drive shaft 64 and spherical bearing 66. Segment 70 is splined into tubular drive shaft 72 which in turn is coupled to drive shaft segment 74. Drive shaft segment 74 is coupled to the rear end wall 76 of the feeding and threshing section by coupler 78. A torque tube 80 extends forward from coupler 78 to the forward end wall 82 which is provided with stub shaft 84 which is rotatably received in bearing 86. Bearing 86 is mounted to plate 88 which is part of the supporting structure of the combine and is mounted to the sidesheets of the combine. The drive shaft segments 70 and 74 are provided with collars 90 for engaging the various bearings.

Drive shaft segment 74 passes through the midpoint support bearing assembly 100. Assembly 100 is provided with a saddle 102 that is mounted to the sidesheets of the combine. The saddle 102 has a semi-circular opening 103 for receiving sealing disc 104. The sealing disc 104 comprises a circular sealing ring 106 extending around the circumference of the threshing section/-separating section interface and a web 108 extending across the ring and located between the threshing and separating sections.

A bearing 110 is mounted to the center of the disc. Drive shaft segment 74 passes through this bearing. The sealing ring is provided with tapped holes to which bolts 112 are secured for mounting the disc on the saddle. The sealing ring is also provided with inwardly projecting vanes 114 which prevent dust, debris and dirt from accumulating between the ring and the rotor.

Figure 9:
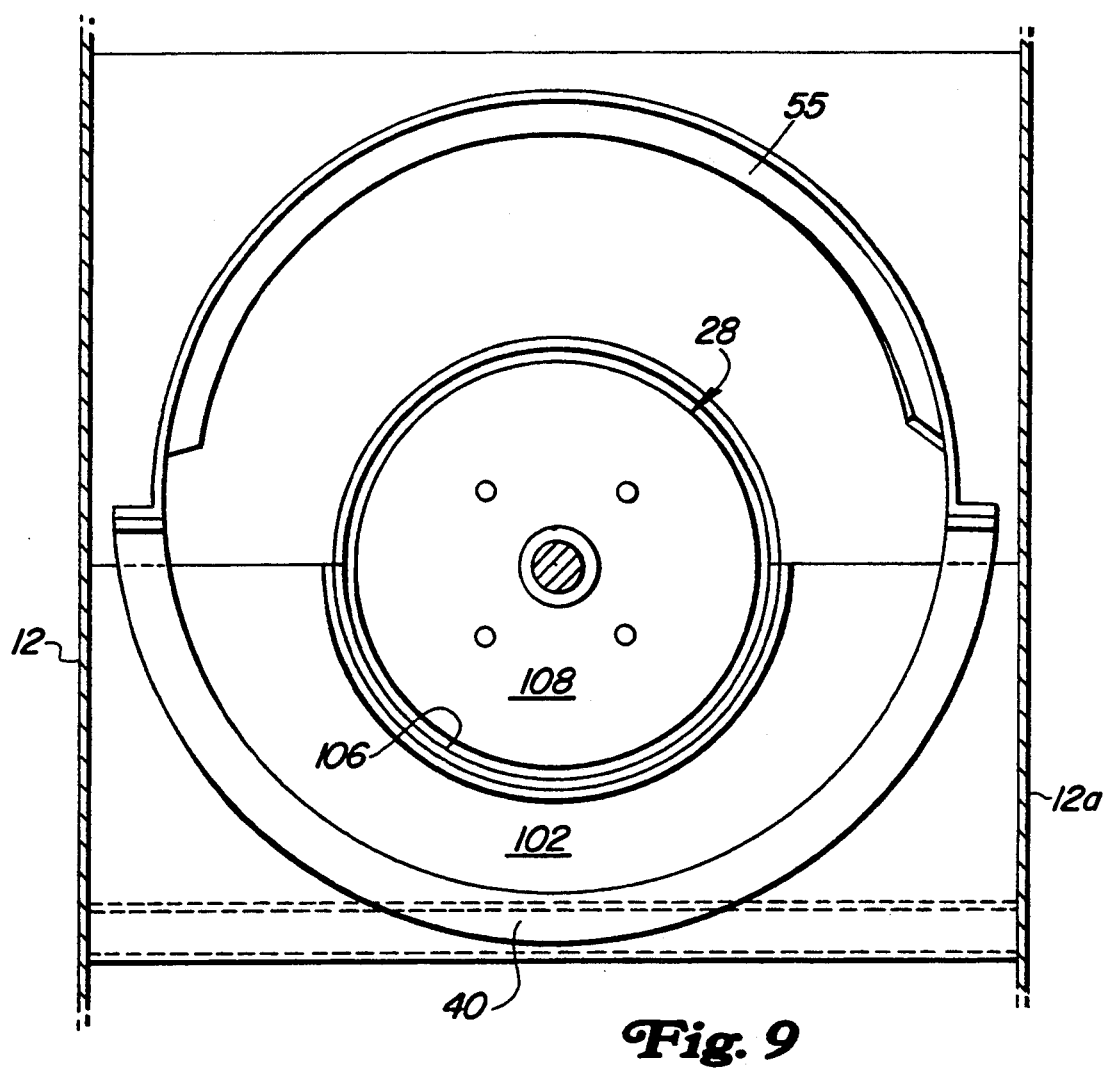

It should be noted that the saddle extends across the bottom portion of the housing, as illustrated in FIG. 9. As such, it would normally form a dam preventing the flow of crop material from the threshing section of the rotor housing to the separating section of the rotor housing. However, the spiked teeth of the threshing section engage the crop material and throws it up against the helical vanes where it is driven over the saddle.

The present invention provides a midpoint bearing for supporting an independent drive arrangement. As such it should not be limited by the above described embodiment, but should be limited solely by the claims that follow.

We claim:

1. An axial flow combine for harvesting, threshing and separating crop material comprising:
    a supporting structure;
    ground engaging means extending from the supporting structure for transporting the supporting structure around a field;
    a cylindrical rotor housing located inside the supporting structure, the rotor housing is provided with a forward portion having an inlet for receiving crop material, a rear portion having an outlet for unused crop material, a bottom portion having an open grate, and a top portion having inwardly projecting helical vanes for indexing crop material from the inlet of the forward portion to the outlet of the rear portion, the housing is also provided with a central housing longitudinal axis extending through the housing;
    a rotor located in the rotor housing having a central rotor longitudinal axis located below the central housing longitudinal axis, the rotor is provided with crop engaging assemblies extending outward from the rotor for engaging crop material passing through the rotor, the rotor having a threshing section and a separating section;
    means for driving the threshing and separating sections of the rotor independently of one another; and
    a midpoint support bearing assembly located between the threshing and separating sections for supporting the rotor, the midpoint bearing assembly is mounted to the supporting structure of the combine.

2. An axial combine as defined by claim 1 wherein the mid point bearing assembly comprises a saddle structure mounted to the supporting structure across the bottom portion of the rotor housing and a sealing disc which is mounted to the saddle and extends between the threshing and separating sections of the rotor.

3. An axial combine as defined by claim 2 wherein the sealing disc comprises a circular sealing ring extending around the outside of the rotor and a web mounted to the ring and extending between the threshing and separating sections, 4. An axial combine as defined by claim 3 wherein the threshing section and the separating section forms a threshing section/separating section interface that is covered by the sealing ring.

5. An axial combine as defined by claim 4 wherein the circular sealing ring is provided with inwardly projecting vanes for preventing dirt from accumulating between the rotor and the ring.

6. An axial combine as defined by claim 5 wherein the web of the circular sealing ring is provided with a bearing assembly through which a drive shaft passes for driving the threshing section independent of the separating section.

* * * * *